United States Patent Office 3,442,127
Patented May 6, 1969

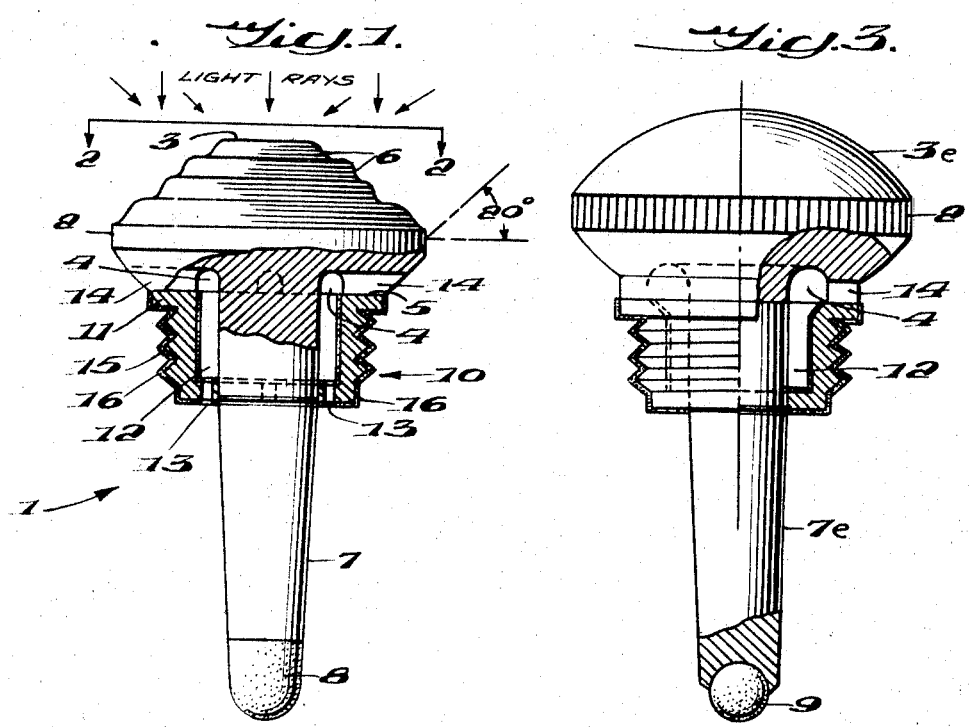
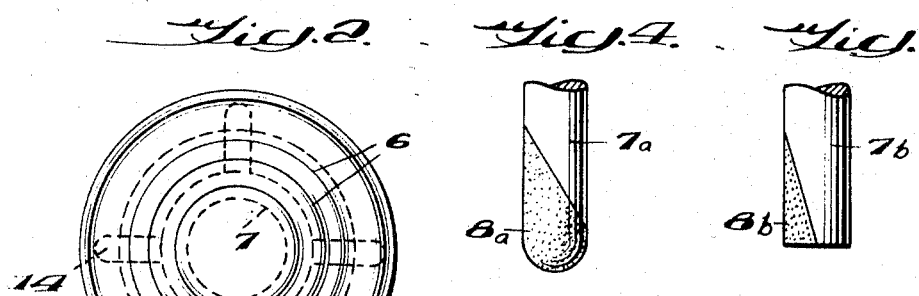
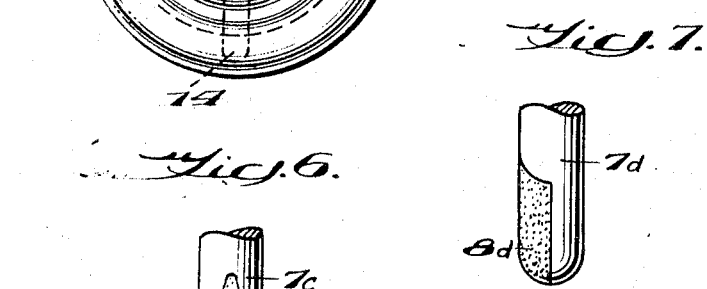
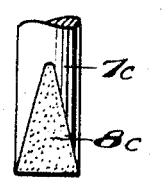

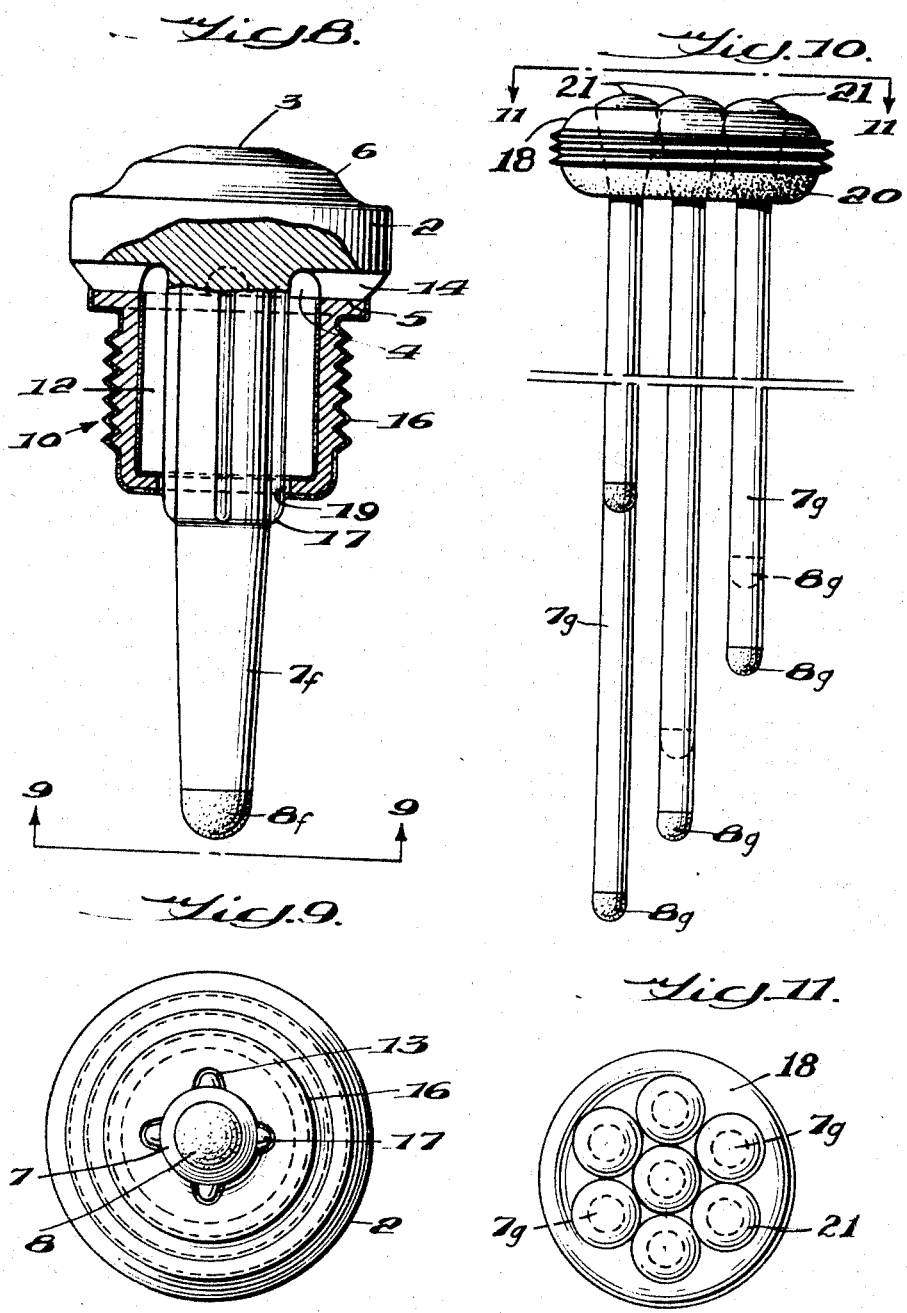

3,442,127
LIQUID LEVEL INDICATOR
Edgar B. Nichols, 325 W. Main St.,
Moorestown, N.J. 08057
Filed Aug. 29, 1966, Ser. No. 575,811
Int. Cl. G01 23/02
U.S. Cl. 73—327                    8 Claims

ABSTRACT OF THE DISCLOSURE

A liquid level indicator having a transparent head that collects and magnifies a plurality of visual signals from a first visual signal means positioned at the end of a stem connected to said head and a second reflective material layer carried by a plug also connected to the transparent head.

---

This invention relates to a liquid level indicator and, more particularly, to an indicator which is used to indicate the liquid level in batteries, gas or oil tanks, radiators, and the like.

In the past, many liquid indicators have been constructed but they have been found unsatisfactory for a variety of reasons. One such reason is that many fail to concentrate and magnify light rays so as to properly set forth distinctive and clear visual signals in order to easily and accurately determine the level of the liquid measured.

This invention contemplates a novel liquid level indicator which comprises an enlarged transparent head, an elongated stem, extending from the head and carrying a means for providing a first distinct visual signal, and a cylindrical plug positioned about the stem adjacent the head. A means for maintaining a constant visual signal, different from the first mentioned signal, is provided about the plug. Further, the head carries a means for collecting and magnifying the visual signals through the head.

Further, one surface of the head of this novel liquid level indicator may be generally convex, having a plurality of corrugated ridges therearound, for facilitating the production of distinctive signals.

This novel liquid level indicator thus conducts, reflects and magnifies light rays so as to simply, easily and accurately transmit to a viewer a plurality of signals to indicate various levels of a liquid in a container.

Other important features will appear from the following description and claims, when considered in connection with the accompanying drawings, in which:

FIG. 1 is an elevation view of the invention, partly in section;
FIG. 2 is a view taken along line 2—2 of FIG. 1;
FIG. 3 illustrates a modification of the invention;
FIGS. 4, 5, 6 and 7 show various reflectors contemplated by this invention;
FIG. 8 illustrates a still further modification of the invention;
FIG. 9 is a view along line 9—9 of FIG. 8;
FIG. 10 illustrates yet another embodiment of the invention; and
FIG. 11 is a view along line 11—11 of FIG. 10.

This novel liquid level indicator, generally indicated by 1, comprises an enlarged cylindrical shaped transparent head 2 having an upper generally convex surface 3 and a lower planar surface. The lower surface carries a circular groove 4 extending into the head 2 to thereby define a circular ridge 5 extending around the periphery of the lower surface. The convex upper surface of the head in the preferred embodiment has a plurality of circular ridges 6 which extend around the upper surface 3.

Secured to the lower planar surface and extending downwardly is an elongated, slightly tapered stem 7. This stem 7 is the part of the liquid level indicator that will be ordinarily immersed in the liquid which is to be measured. The stem 7, illustrated in the drawings, is circular in cross section but it is understood that it may have any suitable cross-sectional configuration, such as square or rectangular.

At the end of the stem 7, opposite the head 2, the stem 7 carries a variable reflector 8 for providing a first distinct visual signal. It is preferred that the reflector be in the form of a coating of semi-transparent bright red or fluorescent acrylic lacquer, as shown in FIGS. 1 and 4–7 of the drawings.

The variable reflector 8 of FIG. 1 is shown as uniformly covering the entire lower end of the stem 7. In the modifications as shown in FIGS. 4–7, the coatings are affected such that one side of the surface of the stems 7a–7d carries a predominant amount of coating material.

A still further modified form of the variable reflector that is contemplated by the invention is illustrated in FIG. 3 of the drawings. The liquid level indicator is shown having a convex surface 3e and a spherical ball 9 attached to the lower end of the stem 7e. This spherical ball 9 may be itself made of a reflecting substance, or carry a coating of the bright lacquer aforementioned.

Positioned about the stem 7 is a hollow cylindrical plug 10. At its upper end, the plug 10 carries a flange 11 which extends peripherally around the plug 10. From a viewing of FIG. 1, it is thus seen that the plug 10 is so positioned about the stem 7 that the flange 11 of the plug 10 abuts up against the ridge 5 of the head 2.

The lower end of the plug 10 fits tightly about and is anchored on the stem, due to the fritcion present between the tapered stem 7 and the lower end of the plug 10.

With the hollow plug 10 positioned in abutting relationship against the head 2 and about the stem 7, a liquid expansion chamber 12 is thereby defined.

The lower end of the plug 10 carries a plurality of plug vents 13 extending therethrough. The vents are vertically arranged in a direction along the axis of the stem 7 and thus provide communication to the expansion chamber 12.

The head 2 also is provided with a plurality of head vents 14. These vents 14 extend in a horizontal direction perpendicular to the axis of the stem, and thereby enable the expansion chamber 12 to communicate with the atmosphere.

Since the vents 13 and 14 and the expansion chamber 12 all communicate with one another, any gaseous build up, which might accumulate within a liquid container after the liquid level indicators are connected to the container, is dissipated since the gas in the container would be dissipated to the atmosphere by passage through the plug vents 13, expansion chamber 12, and out into the atmosphere through head vents 14.

The exterior cylindrical surface of the plug 10 is provided with threads 15 and carries constant reflector 16 for providing a constant visual signal different from the visual signal provided by the variable reflector 8. In like manner, as with respect to the variable reflector 8, the variable reflector 16 may be in the form of a coating of fluorescent acrylic lacquer located about the plug 10.

However, the coating of the constant reflector 16 must necessarily be of a different color than the coating of the variable reflector 8 in order to visually differentiate the visual signals reflected by each reflector.

The operation of the novel liquid level indicator may be described as follows. Light rays from above pass into the head 2 and are reflected and concentrated by the upper surface 3 of the head toward and into both the stem 7 and hollow plug 10. The light rays, passing into the stem, are then reflected by the reflector 8, back up the stem 7 and into the head 2, where the concentrated light rays are magnified and become visible to a viewer looking at the upper surface 3 of the head 2.

In like manner, the light rays passing into the plug 10, having the constant reflector 16, are reflected back into the head 2, where the concentrated light rays are magnified and flow outwardly from the upper surface 3 of the head 2.

Accordingly, since both the plug 10 and the stem 7 carry reflectors 8 and 16, which are different from one another, two distinct visual signals are present, emanating from the upper surface 3 of the head 2. Thus, it is understood that if the stem reflector 8 carried an illuminating bright red color, and the plug 10 was coated with a bright green illuminating material, the peripheral area of the transparent plug 10 would become visible with a green color, while the interior area of the head would exhibit a red color. This same effect yould always occur when the stem is not immersed in any liquid.

However, when the liquid level indicator is positioned in communication with a container having the liqud to be measured, light rays, passing downwardly through the stem, are not reflected back up the stem when the stem is immersed in the liquid. Instead, the light rays pass into and are diffused through the liquid. Accordingly, when the stem is submerged in the liquid, only a constant green visual signal would be evident, emanating from the upper surface of the head.

FIGS. 8 and 9 illustrate a modified form of the invention. In this embodiment the stem 7f is provided with a plurality of ribs 17 mounted axially along the outer surface of the stem 7f. These ribs 17 are adapted to fit into the vertical vents 19 provided in the hollow plug 10 in such a way as to prevent the rotation of the hollow plug about the stem when the liquid level indicator is screwed into place within a container for use with, for example, a battery. The cross-sectional area of the vents 19 should be slightly larger than the cross-sectional area of the ribs 17 in order to allow any liquid which might be present within the expansion chamber 12 to drain down through the vents 19, along the ribs 17.

FIGS. 10 and 11 of the drawing illustrate still another embodiment of the invention. In this embodiment a plurality of heads 21 and stems 7g and reflector material 8g of the type already described, are arranged in a cluster and bound together by a transparent threaded plug 18. Each stem 7g is of a different length and carries a different reflector at its end for providing a different visual signal from the others.

The plug 18 carries a reflector 20 at its lower portion that provides a constant visual signal. Further, the plug 18 is so constructed to hold the elongated heads and stems in juxtaposition to one another to form a unitary structure.

Since each stem is of a different length, and since each stem carries a reflector capable of providing different visual signals from each other and from the reflector 20, carried by the plug 18, a plurality of different liquid levels may be measured by this embodiment. This form of the invention is advantageous in continuously and closely monitoring the rising and falling of a liquid level in a container.

It is also understood that the visual signal emanating from the head 2 is readily visible to a viewer, since the light rays reflected therefrom may be easily observed from any angle except the true horizontal. It has been found that the visual signals are readily viewable at an angle of 20° from the horizontal or, stated differently, the visual signals may be seen at any angle up to 70° from a line passing through the axis of the stem.

It is to be still understood that, while in the preferred embodiment, the constant reflecor 16 has been disclosed as being a coating of fluorescent acrylic lacquer, this invention contemplates the use of a plug 10 which is molded of a colored plastic acrylic resin. Accordingly, the means for providing a constant visual signal would be incorporated within the plug 10.

Having thus described the invention with particular reference to the preferred forms thereof, it will be obvious to those skilled in the art to which this invention pertains, after understanding the invention, that various changes and modifications may be made therein without departing from the spirit and scope of the invention.

I claim:

1. A liquid level indicator comprising a transparent head, an elongated transparent stem extending from the head, said stem carrying a means for providing a first distinct visual signal said means being positioned at the end of the stem remote from the head, a generally cylindrical plug positioned about the stem, and a reflective coating positioned about the plug for maintaining a constant visual signal different from the first visual signal, said head carrying a means for collecting and magnifying the visual signals outwardly through the head.

2. A liquid level indicator comprising a transparent head having a generally convex upper surface, an elongated transparent stem extending axially downwardly from a lower portion of the head, said lower portion of the head carrying a narrow circular lip having a plurality of vents extending therethrough, said stem carrying a means for providing a first distinct visual signal said means being positioned at the end of the stem remote from the head, a generally cylindrical plug positioned about the stem, said plug being in contact with the peripheral edge of said lip thereby forming a circular cavity defined by the stem, head and plug, said plug also having a lower end which carries vent holes, and a reflective material layer carried by the plug for maintaining a constant visual signal different from the first visual signal, said head carrying a means for collecting and magnifying visual signals outwardly through the head.

3. A liquid level indicator comprising a transparent head, an elongated transparent stem extending from the head, said stem carrying a means for providing a first distinct visual signal, said means being positioned at the end of the stem remote from the head, a generally cylindrical plug positioned about the stem, a separate reflective material layer positioned about the plug for maintaining a constant visual signal different from the first visual signal, said head carrying a means for collecting and magnifying the visual signals outwardly through the head.

4. The liquid level indicator of claim 3 wherein said first signal means includes a reflective surface.

5. The liquid level indicator of claim 3 wherein the stem extends axially downwardly from the lower portion of the head and the upper surface of said head is generally convex.

6. The liquid level indicator of claim 5 wherein said convex surface carries a plurality of ridges therearound.

7. The liquid level indicator of claim 3 wherein the plug is positioned about a plurality of stems, each of said stems carrying a separate head and a separate means for providing a visual signal distinct from one another and distinct from the constant signal means.

8. The liquid level indicator of claim 3 wherein said collecting and magnifying means reflect and magnify light rays from the head at an angle up to 70° from a line passing through the axis of the stem.

(References on following page)

References Cited

UNITED STATES PATENTS

| | | | |
|---|---|---|---|
| 1,724,716 | 8/1929 | Kryzanowsky | 73—327 |
| 1,891,520 | 12/1932 | Bowley. | |
| 1,883,971 | 10/1932 | Kryzanowsky | 73—327 |
| 2,368,705 | 2/1945 | Dupont et al. | 73—327 |
| 2,620,660 | 12/1952 | Goldsmith | 73—327 X |
| 2,943,530 | 7/1960 | Nagel | 73—327 X |
| 3,345,870 | 10/1967 | Yoshinaga | 73—327 |
| 3,362,224 | 1/1968 | Melone | 73—327 |

LOUIS R. PRINCE, *Primary Examiner.*

D. M. YASICH, *Assistant Examiner.*

U.S. Cl. X.R.

88—14